United States Patent [19]

Gurries

[11] 4,250,760

[45] Feb. 17, 1981

[54] DRIVE ASSEMBLY FOR RESONANT APPARATUS

[75] Inventor: Raymond A. Gurries, Reno, Nev.

[73] Assignee: The Gurries Company, Sparks, Nev.

[21] Appl. No.: 26,537

[22] Filed: Apr. 2, 1979

Related U.S. Application Data

[63] Continuation-in-part of Ser. No. 973,163, Dec. 26, 1978.

[51] Int. Cl.³ .............................................. F16H 33/00

[52] U.S. Cl. ................................ 74/61; 37/DIG. 18; 172/40; 299/14; 299/37

[58] Field of Search ...................... 299/14, 37; 175/55; 173/49; 74/61; 37/DIG. 18; 172/40

[56] References Cited

U.S. PATENT DOCUMENTS

| | | | |
|---|---|---|---|
| 3,232,669 | 2/1966 | Bodine | 299/37 |
| 3,396,805 | 8/1968 | Muller | 173/49 |
| 3,698,484 | 10/1972 | Kinnan | 172/40 |
| 4,084,336 | 4/1978 | Mizutani et al. | 37/DIG. 18 X |

*Primary Examiner*—Ernest R. Purser

*Attorney, Agent, or Firm*—Townsend and Townsend

[57] ABSTRACT

A pavement chipping tool uses a sonic oscillator which includes a housing integral with a resonant beam. The oscillator includes a rotating shaft journaled in two sets of bearings with an eccentric weight attached to the shaft between the two sets of bearings and a pair of weights on either end of the shaft beyond the bearings. The eccentric mass of the center weight is equal to the sum of the two outer weights. The bearings have inner races keyed to the shaft.

6 Claims, 9 Drawing Figures

DRIVE ASSEMBLY FOR RESONANT APPARATUS

CROSS-REFERENCE TO RELATED APPLICATIONS

This application is a continuation-in-part of application Ser. No. 973,163, filed Dec. 26, 1978, the disclosure of which is incorporated fully herein by reference.

BACKGROUND OF THE INVENTION

This invention relates to road working equipment and, more particularly, to apparatus for removing pavement from a road bed.

When resurfacing a road, it is often desirable to remove the existing pavement in order to maintain the original grade and/or recycle the pavement material in the case of asphalt. There are a number of known procedures for removing asphalt pavement, all of which require an expenditure of a great deal of time, money, and/or effort.

One procedure is to soften the asphalt pavement with a radiant heater or flame burner, and then clean off the softened asphalt in layers with the mold board of a road grader. The thickness of each layer removed in this manner is limited by the depth of the asphalt that can be softened by the radiant heater or flame burner, which is very small.

Another procedure that has been used without much success is to remove the asphalt pavement with a plurality of diamond cutting wheels arranged on a common rotating shaft. The experience has been that these cutting wheels are expensive and the operation is slow.

A third procedure is to mill off the pavement in layers with a rotating drum on which carbide tips or teeth are mounted. In order to make a deep cut in the pavement a great deal of downward force needs to be exerted on the drum, which results in too many fine particles if the asphalt is to be recycled.

Still another procedure is to use sonic energy to cut into pavement. As described in Bodine U.S. Pat. No. 3,232,669, a sonic vibration generator is coupled to the upper end of an essentially vertical beam or bar having pavement-engaging teeth or serrations formed at its lower end. The vibration generator supplies energy to the beam at its resonant frequency, and the vibrating teeth at the lower end of the beam cut into the pavement.

SUMMARY OF THE INVENTION

The pavement planing apparatus incorporating the features of the present invention is used for removing asphalt or concrete pavement from a road bed. A transverse cutter blade is mounted on a support frame, the cutter blade being disposed at an acute angle to the surface of a pavement. The cutter blade is reciprocated in a cutting plane by a pair of force transmitting beams which are caused to vibrate in a transverse resonant mode by mechanical oscillators secured to the outer ends of the beams. The free ends of the vibrating beams strike the cutter blade to apply a force to the blade in the cutting plane, causing the cutter blade to plane off the surface of the pavement in a chisel-like manner.

The oscillators secured to the ends of the beams utilize rotating eccentric weights to induce vibration in the beams at their resonant frequencies. The oscillators induce severe mechanical stresses, both in the mounting of the oscillator to the frame and in the rotational support of the eccentric weights. Bearings which will stand up under the high rotational speeds and severe loading stresses have presented serious design problems.

The present invention is directed to an improved oscillator design which is more rugged, durable, and longer-lasting. This is accomplished by one or more features single or in combination in the design and construction of the oscillator and beam assembly. More particularly, the present invention provides a sonic oscillator comprising a beam supported to vibrate about two intermediate nodel points. A mechanical oscillating drive means secured to one end of the beam induces resonant lateral vibration of the beam about said nodel points. The oscillating drive means includes a housing in which are mounted two pairs of axially aligned spherical roller bearings, a shaft journaled in the bearings, an inner eccentric weight secured to the shaft between the pairs of bearings and two outer weights secured to the shaft adjacent opposite ends of the shaft, the center weight being twice the outer weights, and means for rotating the shaft and eccentric weights at the resonant frequency of the sonic oscillator. The beam and housing are forged as an integral unit. The bearings have an inner race which slips axially along the shaft but which is keyed to the shaft for rotation with the shaft.

BRIEF DESCRIPTION OF THE DRAWINGS

For a more complete understanding of the invention reference should be made to the accompanying drawings, wherein.

DETAILED DESCRIPTION

Figure 1:
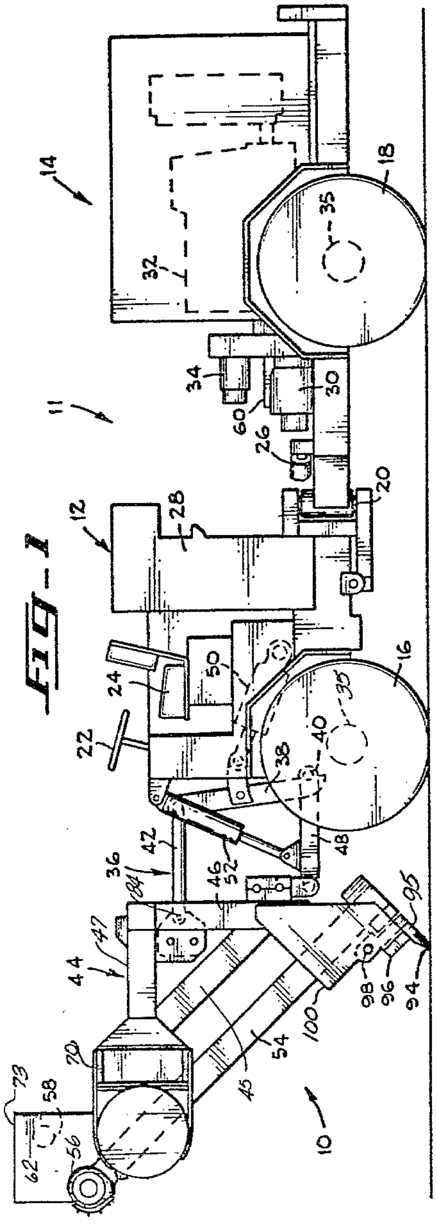
FIG. 1 is a side elevational view of a tool driving apparatus embodying the present invention.

It is the general objective of the present invention to provide apparatus for effectively applying driving force to a tool, such as a cutter blade, for rapidly shearing or cutting hard material such as a layer of concrete, asphalt, or other material from a roadway or similar surface, or to various other tools specific to a particular operation.

Specifically, the tool can take the form of a cutter blade having an elongated cutting edge arranged to engage concrete or other material to be removed at a controlled angle and at a controlled depth, and having a transverse disposition so that, upon energization, a swath of predetermined width can be simultaneously removed. The cutter blade is mounted from a powered and steered mobile frame for reciprocating motion, which mounting preferably constitutes a pivotal support for the cutter blade so that it moves arcuately first in a forward cutting direction and then rearwardly. The point of pivotal support is in advance of the cutting edge in the direction of cutting so that such pivotal motion is directed angularly downward into the material which is to be cut or severed, and at an angle which will vary dependent on the hardness and other mechanical properties of the material, and which can be adjusted to optimize the operation.

Force impulses arre delivered cyclically to the pivotally supported cutter blade by reciprocating drive means, which on its forward stroke engages and drives the cutter blade into the material and thence withdraws preparatory to a subsequent driving stroke, forming a gap between the cutter blade and the drive means. Forward motion of a mobile supporting frame generates a tractive force which tends to close the gap in a fashion such that the reciprocating drive means is brought into contact with the cutter blade after the former's speed (and momentum) approaches a maximum in the forward or cutting direction. Thus, the drive means is in driving contact with the cutter blade itself for less than 90° of any given cycle.

The drive means takes the form of a resonant force transmitting member powered by a sonic generator or oscillator incorporating the general principles embodied in the unit shown and described in the aforementioned patent. However, the resonant member constitutes a generally upright beam mounted by a resilient tire at its upper node position to accommodate "pseudonodes" generated during operation. An additional rigid member engages the beam at its lower node position to support and maintain the desired beam disposition. The sonic generator is connected to the resonant beam at its upper end and preferably includes multiple eccentric weights mounted in spaced relation with a multiplicity of bearings on a common shaft so that the requisite force may be generated while minimizing the shaft diameter, and the peripheral speed and wear of the bearings because of the distribution of the bearing loads. The lower end of the beam lies adjacent the cutter blade to deliver the force impulses in substantial alignment with the cutting direction.

The input force generated by the sonic generator is greater than the described tractive force resultant from the forward motion of the powered mobile supporting frame, and as a consequence, there is no possibility for clamping of the beam end against the cutter blade (and the engaged material), which would stop the resonant actuation and permit the vibratory action of the sonic generator to be applied in a harmful fashion to itself and the supporting frame members.

Obviously, the same force imbalance principle can be applied to other tools such as mentioned, with the same critical and advantageous effect. In each case, however, it is important that the sonic generator provide an input force greater than that of a continuing tractive effect or its equivalent force tending to close the gap.

Figure 2:
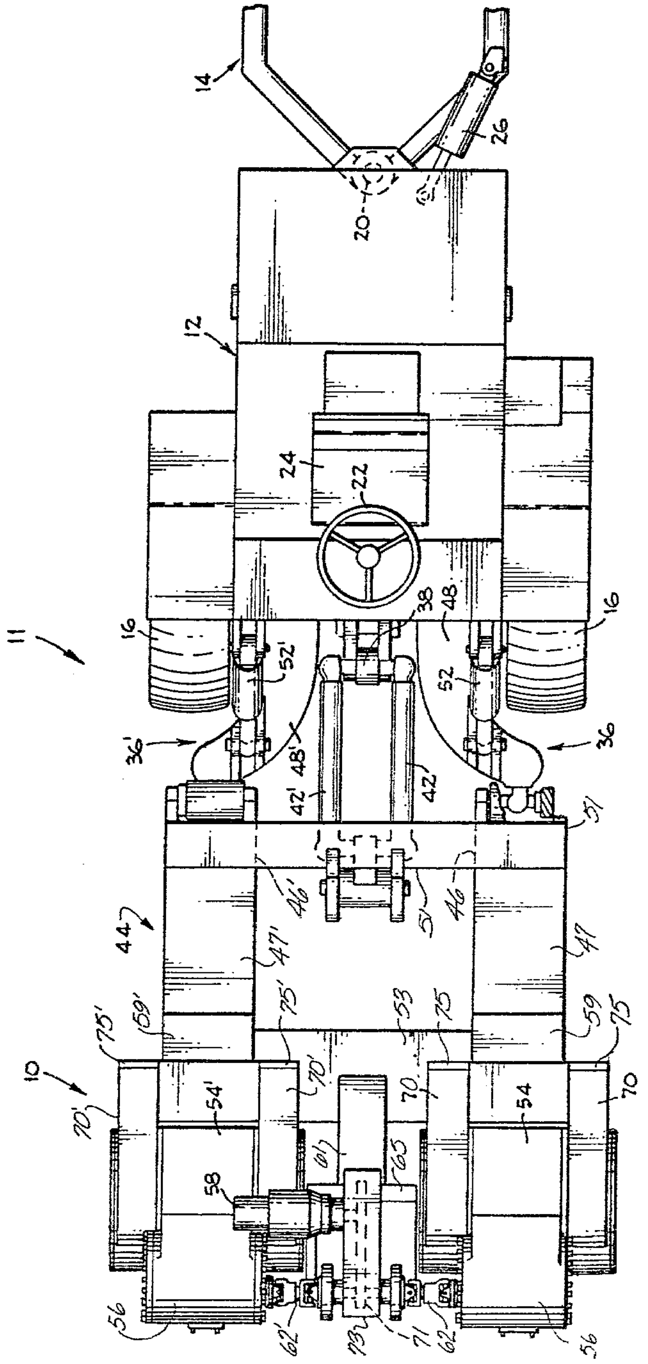
FIG. 2 is a top plan view of the front of the apparatus of FIG. 1.

With initial reference to FIGS. 1 and 2, a material cutting assembly generally indicated at 10 is mounted at the front of a mobile carrier 11 which includes forward and rearward frame sections 12, 14, each supported by two rubber-tired wheels 16, 18, the two frame sections being connected by a vertical pivot pin 20 which enables articulation of the frame sections for purposes of steering. Material cutting assembly 10 is specifically designed to cut asphalt or concrete pavement as found on streets, roads, and highways.

A steering wheel 22 is mounted forwardly of a driver's seat 24 on the front section 12 of the frame and is arranged to energize, upon turning, a hydraulic ram 26 pivotally joining the frame sections 12, 14 so as to effect articulation thereof and consequent steering. A hydraulic pump 30 is mounted on the rear section 14 of the frame, and driven by an internal combustion engine 32. Fluid from a hydraulic reservoir 28 is driven by pump 30 through suitable hydraulic conduits (not shown) to hydraulic ram 26.

The engine 32 also drives a second hydraulic pump 34 which is hydraulically connected to hydraulic motors 35 to drive the wheels 16 on the front frame section 12 and the wheels 18 on the rear frame section 14, thus to provide motive power for the entire mobile carrier 11 in a generally conventional fashion. As will be understood, the motive power delivered to the wheels will urge the front-mounted cutting assembly 10 against material being cut with a certain tractive force which, for cutting a six-foot swath of concrete or asphalt, should vary for example between 5,000 and 60,000 pounds, depending upon the material resistance and vehicle speed. Assuming the weight of the vehicle and its load, i.e., material cutting assembly 10 and mobile carrier 11, is 75,000 pounds, the maximum tractive force, i.e., motive power delivered to the wheels, must be less than the weight of the vehicle and its load, e.g., about 60,000 pounds, to prevent slippage of wheels 16 and 18. As is well known in the art, the maximum tractive force of the vehicle depends upon the friction between the wheels and the surface on which it moves.

Material cutting assembly 10 is symmetrical about a center plane in the direction of movement, i.e., parallel to the plane of FIG. 1. Many of the elements on the right side of the center plane, as viewed from the front, i.e., the left in FIG. 1, which are identified by unprimed reference numerals, have counterparts on the left side of the center plane, which are identified by the same reference numerals primed.

In order to mount the mentioned material cutting assembly 10, a pair of laterally-spaced parallelogram units 36, 36' extend forwardly from the forward frame section 12. More particularly, the parallelogram units 36, 36' include an upstanding leg 38 pivotally connected at its lower extremity to the central portion of a fixed transverse shaft 40 on the front frame section 12 and pivotally joined at its upper extremity to the rear ends of forwardly projecting legs 42, 42'. These forwardly projecting legs 42, 42' are pivotally joined at laterally-spaced positions (see FIG. 2) to a generally triangulr cutting assembly support frame 44. Cutting assembly frame 44 comprises spaced apart, upright support beams 46, 46', spaced apart, forwardly projecting support beams 47, 47', struts 45, 45', and cross beams 49, 51, and 53. Downwardly and forwardly angled stop mounts 57, 57' are formed near the bottom of upright support beams 46, 46'. At its ends, cross beam 51 is attached, for example by welding, to the top of support beams 46, 46', and the back of support beams 47, 47'. At the front of support beams 47, 47' are formed vertically flared bracket mounts 59, 59'. Cross beam 53 is connected between flared bracket mounts 59, 59' and is attached thereto, for example, by welding. An upwardly and forwardly extending platform support beam 61 is attached, for example by welding, to the middle of the cross beam 53. A platform 65 having mounting blocks 89 is attached to the upper end of support beam 61, for example by welding. Struts 45, 45' are connected between beams 47, 47' near the front, and beams 46, 46' near the bottom and are attached thereto, for example by welding. Cross beam 49 is connected between support beams 46, 46' near the bottom and is attached thereto, for example by welding. Pairs of rectangular brackets 75, 75' are attached, for example by welding to the sides of flared bracket mounts 59, 59'. Support beams 46, 46' and cross beams 49 and 51 are made of solid steel so their mass per unit length is as large as possible. Support beams 47, 47', including bracket mounts 59, 59', struts 45, 45', and cross beam 53 are hollow so their mass per unit length is as small as possible. Consequently, the resultant center of gravity of cutting assembly frame 44 is rearwardly located near support beams 46,46'. Support beams 46, 46' form the forward upright legs of the parallelogram units 36, 36'. Lower and outwardly curving legs 48, 48' are pivotally connected at their opposite extremities to the lower ends of the support beams 46, 46' and the previously described shaft 40, thus completing the two parallelogram units 36, 36'. Brackets 80, 80' are attached to cross-beam 51, for example by welding. Forwardly projecting legs 42, 42' are connected to brackets 80, 80' by pivoting links 84, 84' (FIG. 1). Pairs of brackets 85, 85' are attached to upright support beams 46, 46', for example by welding. Outwardly-curving legs 48, 48' are connected to bracket pairs 85, 85' by pivot pins 87, 87'.

A powered hydraulic ram 50 is pivotally secured between the forward frame section 12 and the rear upright legs 38, 38' of the parallelogram units 36, 36' to enable powered variation of the parallelogram disposition and accordingly the angular disposition of the cutting assembly 10. Additional powered hydraulic rams 52, 52' pivotally joined to the top of the frame section 12 and the lower generally horizontal legs 48, 48' of the parallelogram units 36, 36' enable substantially vertical adjustment of the cutting assembly.

The cutting assembly frame 44 supports a pair of resonant beams 54, 54' in the form of angularly upright parallel resonant beams composed of solid steel or other elastic material. Resonant beams 54, 54' are approximately parallel to struts 45, 45'. Sonic generators in the form of a pair of synchronized orbiting mass oscillators 56, 56' are positioned at the upper extremity of each resonant beam and generally incorporate the principles of an orbiting mass oscillator of the type shown in either U.S. Pat. No. 2,960,314 or U.S. Pat. No. 3,217,551. (The disclosures of these patents are incorporated fully herein by reference.) Orbiting mass oscillators 56, 56' are driven by a suitable hydraulic motor 58, that is energized through suitable hydraulic conduits (not shown) from a third hydraulic pump 60 driven by the previously described engine 32.

Figure 7:
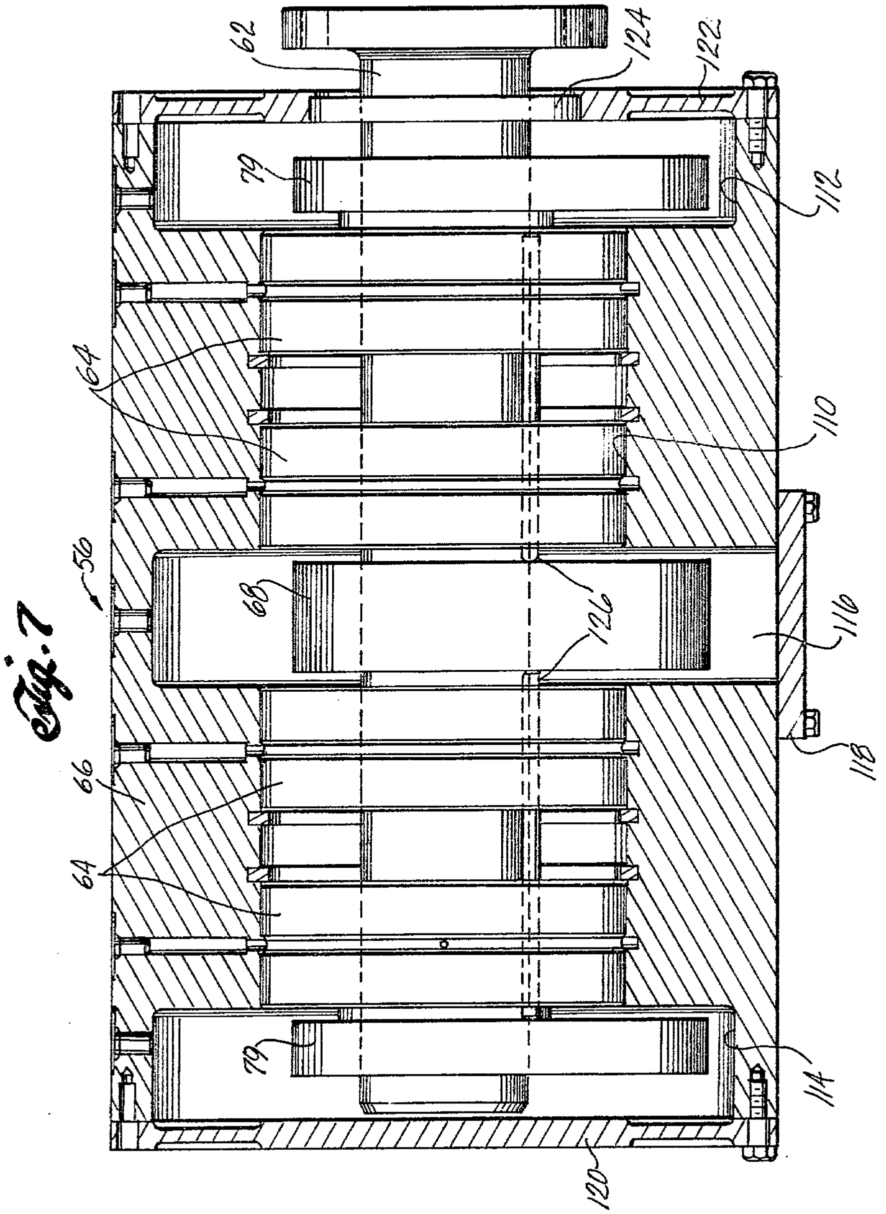
FIG. 7 is a detailed sectional view taken substantially on the line 7—7 of FIG. 3 showing details of the mechanical oscillator mechanism.

Referring to FIG. 7, the mass oscillator 56 is shown in more detail. The mass oscillator includes a housing 66 which is cast or forged in one piece with the resonant beam 54. The housing is generally semicircular in shape and includes a central cylindrical bore 110 opening at both ends in enlarged end chambers 112 and 114. A central chamber 116 intersects the bore 110. The central chamber 116 is closed off by a cover 118 bolted to the cylindrical side wall of the housing. A pair of end plates 120 and 122 are bolted to the ends of the housing to enclose the end chambers.

A shaft 62 is journaled in the housing by four bearings, indicated at 64. The bearings are arranged in pairs on either side of the central chamber 116. Each of the bearings is preferably of a self-aligning spherical type roller bearing having an outer race which is press-fitted in the cylindrical bore 110 and having an inner race which slidably engages the shaft 62. An eccentric weight 68 is secured to the shaft 62 within the chamber 116. Outer eccentric weights 79 are secured to the shaft at either end. One end of the shaft 62 extends through the end plate 122 for coupling to the external drive, a suitable rotary seal 124 being mounted in the end plate 122 where the shaft extends out of the housing. The eccentric weight 68 is of the same shape but twice as thick as measured in the axial direction as the end weights 79. The four roller bearings in combination with the integral housing provide a rugged support for the rotating shaft and eccentric weights. The bearing arrangement permits a relatively small diameter shaft to be used. At the same time the load on the bearings is evenly distributed by making the central weight twice as large as the outer weights. The relatively small diameter of the shaft permits the peripheral speed of the bearings to be minimized for a given power level. While two pairs of bearings are shown, if additional eccentric weights are mounted on the shaft, additional pairs of bearings are used. Thus one pair of bearings is always positioned between two adjacent weights.

The self-aligning bearings require that no end thrust be transmitted from the shaft to the bearings. This requires that the shaft 62 remain freely movable axially relative to the inner races of the bearings. However, by providing a sliding fit between the shaft and the inner races of the bearings, some angular slippage takes place between the shaft and the inner races, particularly during acceleration and deceleration of the shaft by the drive source. This slippage results in excessive wear or galling of the metal at the interface. As a result the shaft is not properly supported by the bearings or axially freezes to the bearings. In either case excessive wear and ultimate failure of the bearings results. To prevent relative rotation between the shaft 62 and the inner races of the bearings 64, the inner races are keyed to the shaft 62. The keys are in the form of longitudinal rods 126 which fit into a circular bore, half of which is formed in the outer surface of the shaft 62, the other half of which is formed in the inner races of the bearing 64. Thus the keys act to lock the shaft 62 rotationally to the inner races of the bearing 64 while still permitting relative axial movement between the shaft and the bearings.

A drive shaft 67 is coupled by pairs of tandemly connected universal joints 69, 69' to shaft 62, 62'. Drive shaft 67 is supported by bearings 63, 63' mounted in the sidewalls of a protective housing 73, through which drive shaft 67 passes. Power transmission means 71, such as a belt, chain, or gear train inside housing 73, couples hydraulic motor 58 to drive shaft 67. Lubricating oil is sprayed in housing 73 by means (not shown) onto power transmission means 71 and bearings 63, 63'. Seals (not shown) outside of bearing 63, 63' prevent the oil spray from leaving housing 73. Protective housing 73 is secured to mounting blocks 89. The motor 58 is attached, for example by bolting, to the outside of housing 73. Flyweels 72, 72' are mounted on shaft 67 outside housing 73 for the purpose of isolating motor 58 and power transmission means 71 from transient forces exerted by oscillators 56, 56'. Housing 73 is stationary so drive shaft 67 only rotates. Resonant beams 54, 54+ reciprocate. Tandemly connected pairs of universal joints 69, 69' permit shaft 62, 62' to reciprocate with beams 54, 54' as they are rotatably driven by drive shaft 67.

Figure 3:
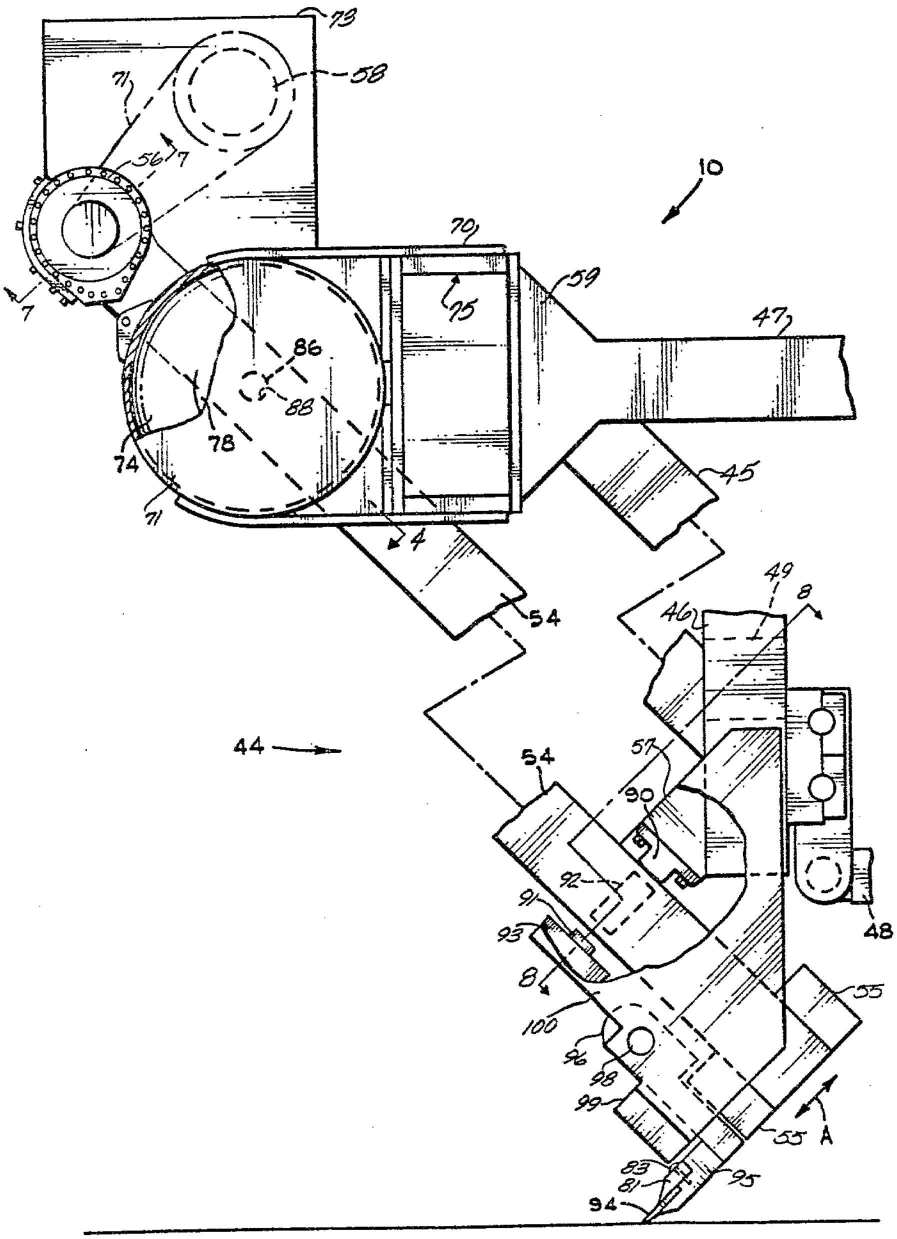
FIG. 3 is a fragmentary enlarged side view of the material cutting assembly of the apparatus with portions broken away to show interior details.
Figure 4:
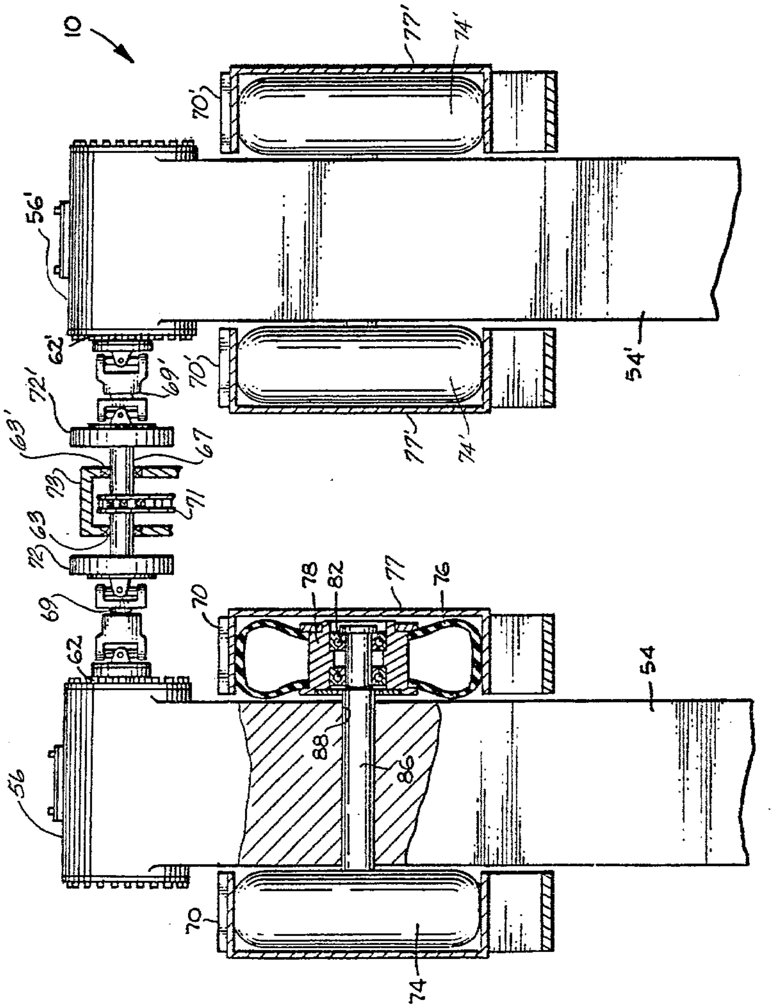
FIG. 4 is a fragmentary cross-sectional view taken along line 4—4 of FIG. 3.

Energization of the exemplary embodiment illustrated provides a total peak energizing input force to the two resonant beams 54, 54' of up to 192,000 pounds in the form of sequential sonic oscillations at a frequency of approximately 70 to 80 cycles per second, i.e., at or near the resonant frequency of resonant beams 54, 54'. Thus, the total peak force provided by oscillators 56, 56' is larger than the weight of the vehicle and its load. These force oscillations, delivered to the upper end of the beam, cause resonant vibration thereof through appropriate dimensional design of such beam at that frequency so that a corresponding cyclical reciprocal vibration at the lower end of the beam is derived, as shown by the arrow A in FIG. 3, preferably with a total peak-to-peak displacement of approximately ½ to ¾ inch. Pairs of weights 55 are attached, for example by bolting, to the front and back of resonant beams 54, 54' at the lower end to increase the momentum thereof. Each resonant beam 54, 54' is designed and so driven that two vibration nodes are formed thereon inwardly from its opposite extremeties, and its ends are free to vibrate, i.e., reciprocate, and in fact do vibrate. In summary, resonant beams 54, 54' are driven to form standing wave vibrations in their fundamental free-form node. Each beam is carried from the cutting assembly frame 44 at its upper node position. However, the connection is resilient to allow for node variations (pseudo-nodes) during actual operation. Specifically, as illustrated in FIGS. 3 and 4, pairs of rectangular brackets 75, 75' are attached, for example by welding, to the sides of flared bracket mounts 59, 59'. Pairs of annular resilient members 74, 74' in the form of pneumatic rubber tires are located inside pairs of cylindrical housings 77, 77'. Housing pairs 77, 77' are held on opposite sides of resonant beams 54, 54' by pairs of connecting arms 70, 70' attached, for example, by bolting, to bracket pairs 75, 75'. Each pair of annular resilient members 74, 74' is mounted on a pair of central hubs 78. Shaft 86 is press-fitted into bore 88 in each of the resonant beams 54, 54' at their upper nodel positions. Hub 78 is mounted for rotation on the ends of shaft 86 by bearings 82. Thus, resonant beams 54, 54' are supported by shaft 86 and are pivotable about their axes by virtue of bearing 82. In the manner of a spring, the described pneumatic tires, which serve as upper node supports for resonant beams 54, 54', accommodate the longitudinal changes in the node position (pseudo-nodes) resulting from loading of the resonant beams, when the cutter blade described below is in engagement with a material to be cut, sheared, or planed, and the internal tire pressure can be changed as required to control the spring constant.

As shown in FIG. 3, at the lower node position, resonant beams 54, 54' are encompassed by rigid metal stop members 90 at their rear, resilient rubber pads 91 at their front, and pairs of resilient rubber pads 92 at their sides. Pad pairs 92 and pads 91 comprise pieces of rubber vulcanized on metal mounting plates. Members 90, pads 91, and pad pairs 92 are secured to the lower end of cutting assembly frame 44. Specifically, stop members 90 are attached, for example by bolting, to mounts 57, 57'. Pairs of brackets 100, 100' are attached to opposite sides of support beams 46, 46', for example by bolting. Cross supports 93, 93' are connected between bracket pairs 100, 100', for example by bolting. Mounts 57, 57', bracket pairs 100, 100', and cross supports 93, 93' define rectangular openings through which the lower portions of resonant beams 54, 54' pass. Pads 91, 91' are secured to cross supports 93, 93', for example by bolting, and pad pairs 92, 92' are secured to the inside of bracket pairs 100, 100', for example by bolting. Pad pairs 92 at the sides of resonant beams 54, 54' are spaced slightly therefrom and serve to guide the resonant beams as they pivot about their upper node support and reduce noise and wear. When resonant beams 54, 54' are at rest, they lie on and are supported by pads 91. When resonant beams 54, 54' are resonating during operation of the apparatus, their lower node is driven up against stop members 90 by the reaction of the material being worked upon as shown in FIG. 3, and remain in abutment with stop members 90 during operation of the apparatus. Thus, stop members 90 serve as rigid lower node supports for resonant beams 54, 54'. Stop members 90 and pads 91 are spaced sufficiently far apart to enable resonant beams 54, 54' to be shimmed to synchronize their transfer of force to the work tool. Specifically, shims 76, 76' are inserted between stop members 90 and stop mounts 57, 57' so the lower extremities of resonant beams 54, 54' in their neutral position are both spaced precisely the same distance from the lever arms and cutter blade described below. Consequently, since oscillators 56, 56' run in phase and resonant beams 54, 54' reciprocate in phase, the lower extremities of resonant beams 54, 54' strike the cutter blade at the same time, i.e., in synchronism. Stop members 90 will in general have to be shimmed to a different degree to achieve the described synchronism, because of manufacturing tolerances. This is accomplished by the following procedure: first, one of the stop members is shimmed; second, the cutter blade is lowered into contact with the road surface; third, mobile carrier 11 is driven forward to rotate resonant beams 54, 54' about their upper node supports, until one of the resonant beams contacts its stop member at the lower node support; and fourth, the other stop member is shimmed until the other resonant beam contacts it. For more details about shimming stop members 90 to synchronize resonant beams 54, 54', reference is made to my copending application Ser. No. 916,112, filed June 16, 1978.

As shown in FIG. 3, the material cutting assembly 10 includes a work tool which takes the form of an angularly-directed and transversely-extending cutter blade 94 held in a blade base 95. Cutter blade 94 and blade base 95 extend along the full width of the apparatus between beams 54, 54'. In other words, cutter blade 94 is transversely elongated and is disposed at an acute angle to the surface of pavement to be cut, extending in a downward and forward direction along a cutting plane to a cutting edge that lies in the cutting plane. Cutter blade 94 is clamped to blade base 95 by a clamping member 81 that is attached to blade base 95 by bolts 83. Lever arms 96, 96' are pivoted about substantially horizontal pivot pins 98, 98' on bracket pairs 100, 100'. Lever arms 96 are attached, for example by welding, to the ends of blade base 95 near resonant beams 54, 54'. It is to be particularly observed, as clearly shown in FIG. 3, that the cutting edge of the cutter blade 94, when in material engagement, lies to the rear of the pivot pins 98 so that any movement of the cutter blade 94 in a forward direction or to the left will be accompanied by a substantial downward force component and thus will result in penetration into the material being cut, without deflection of cutter blade 94 away from material engagement. Furthermore, because the pivotal support provides for a slight arcuate motion of the cutter blade 94, a slight additional separation of the layer of cut material from that lying therebelow will result. Thus, the cutter blade assembly comprising cutter blade 94, blade base 95, retaining bar 81, and lever arms 96 is pivotably supported by brackets 100, 100′ so it is adjacent to the lower extremity of the resonant beams 54, 54′. When the beams reciprocate, they drive the cutter blade assembly in a forward and downward direction or to the left, as shown in FIG. 3, and thereafter withdraw from contact with the cutter blade assembly in its cyclical displacement in the opposite or rearward direction. Thus, only unidirectional driving impulses are delivered to the cutter blade assembly in its forward direction, and in alignment with its cutting direction, so the cutter blade 94 advances with a chisel-like action.

Cutter blade 94 comprises a work tool that moves along the road surface, which comprises the work path. Cutting assembly frame 44 functions as a tool holder or carrier. Continuous unidirectional force is applied thereto by mobile carrier 11 in a direction parallel to the work path. Oscillators 56, 56′ generate a reciprocating force, at least one component of which acts parallel to the work path. Each resonant beam 54, 54′ comprises a force transmitting member, its upper extremity comprising an input to which the reciprocating oscillator force is applied, and its lower extremity comprising an output from which the reciprocating force is transferred to the tool. The tool advances intermittently along the work path responsive to the continuous unidirectional force applied by mobile carrier 11 and the reciprocating force applied by oscillators 56 and 56′.

Obviously, when the cutter blade 94 engages the material, reactive forces will be directed thereagainst, both in horizontal and vertical directions, and will be dependent upon the character of the material. An angle between 45° and 55° relative to the surface of the material has been found optimum for cutting pavement to maintain the ultimate cutting in a plane parallel to the material surface in the direction of machine travel. In general, the harder the material the larger the angle. Thus, for ordinary asphalt the angle has been found to be between 48° and 52°, for soft asphalt the angle has been found to be between 45° and 48°, and for concrete the angle has been found to be between 52° and 55°. The parallelogram units 36, 36′ can be shifted by appropriate energization of the angular adjustment ram 50 to optimize the cutting action on the material encountered. Similarly, the cutting depth of cutter blade 94, below the grade, i.e., surface of the pavement, can be automatically or manually controlled by appropriate energization of the vertical adjustment rams 52, 52′. The previously described design of cutting assembly frame 44, which locates its center of gravity close to upright support beams 46, 46′, i.e., nearly directly over cutter blade 94, permits the weight of cutting assembly frame 44 to counteract most effectively the reactive forces exerted on cutter blade 94 by the material being cut. This minimizes the forces and moments exerted on parallelogram units 36, 36′ by cutting assembly frame 44 and discourages cutter blade 94 from moving out of engagement with the material being cut.

When the beams 54, 54′ withdraw from contact with the cutter blade 94 during resonant vibration a momentary gap is formed which will remain until a repeated forward motion of the beams 54, 54′. To maximize the cutting force, it has been found that contact of the beams with the cutter blade preferably is made in the region where maximum forward velocity (and momentum) of the beams is approached in the forward (cutting) direction. Since the cutter blade 94 is in engagement with material to be cut, the adjacent beam is urged forwardly relative thereto, thus to close the momentary gap at the appropriate time of the resonant cycle.

Figure 5C:
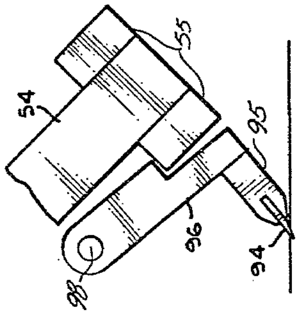
FIGS. 5A–5C are diagrammatic views of the tool and its drive mechanism in different stages of operation.
Figure 5B:
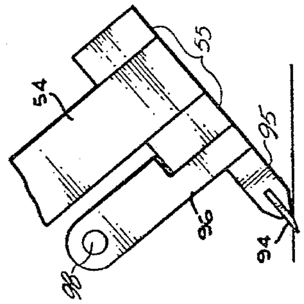
Figure 5A:
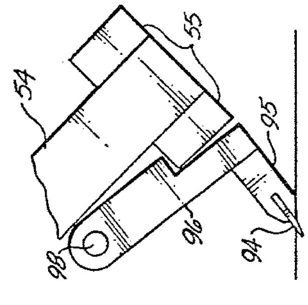

This action, which is important to the effective cutting of concrete, asphalt, and other hard materials, can be explained more readily by reference to FIGS. 5A–5C wherein the various operational dispositions of the cutter blade 94 and the resonant beams 54, 54′ are diagrammatically illustrated in somewhat exaggerated form for purposes of explanation.

Figure 6:
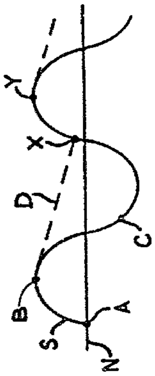
FIG. 6 is a graph showing the relationship of time and displacement of the tool and drive mechanism in the various operational stages shown in FIGS. 5A–5C.

In the time-displacement graph of FIG. 6, the abscissa N represents the neutral position of beams 54, 54′, sinusoidal waveform S represents the reciprocating displacement of the beam outputs about their neutral position as a function of time, and the dashed line represents the position of the tool, i.e., cutter blade 94, relative to frame 44 as a function of time. For maximum force transfer, it is desirable for the beams to strike the tool when the beam outputs are traveling at maximum forward velocity, i.e., at the neutral position of the beam outputs. The neutral positon of the beam outputs is their position when at rest, i.e., not resonating or being deflected, while the beam is in operating position, i.e., pivoted into abutment with stop member 90. During operation, as beams 54, 54′ resonate, when the beam outputs are at their neutral position, which is represented by point A in FIG. 6, a small momentary gap typically exists between beams 54, 54′, and the back surface of lever arms 96, as illustrated in FIG. 5A. As the beam outputs move slightly forward from their neutral position toward the tool, they simultaneously strike the tool and drive it forward to perform the desired work, i.e., cutting through the concrete or asphalt road surface. The beam outputs remain in contact with the tool, as illustrated in FIG. 5B, until the beam outputs reach the forward extremity, i.e., peak, of their reciprocating excursion, which is represented by point B in FIG. 6. This is approximately slightly less than 90° of the beam reciprocation cycle. As the beam outputs begin to move in a rearward direction on their reciprocating excursion a momentary gap is formed between the beam outputs and the tool, which is represented by the distance between lines D and S in FIG. 6. The continuous forward movement of frame 44 with mobile carrier 11, while the tool is held stationary by engagement with the road surface, reduces the distance between the tool and the neutral position of the beam outputs, which is represented in FIG. 6 by the slope of line D toward line N. When the beam outputs are moving in a rearward direction, beams 54, 54′ are spaced from lever arms 96, as illustrated in FIG. 5C. The momentary gap between the tool and the beam outputs is maximum at a point of their reciprocating excursion slightly before the rear extremity, which is represented by point C in FIG. 6. In summary, during each cycle of reciprocation of beams 54, 54′, the beam outputs contact the tool during a short interval approaching 90° of the beam cycle, which is represented in FIG. 6 by the distance along waveform S between point X and Y. During the remainder of each cycle, the beam outputs are out of contact with the tool, which is represented in FIG. 6 by the distance along line D between points B and X. As previously indicated, the most efficient transfer of force from the beam outputs to the tool occurs with a contact interval approaching 90° of the beam cycle. To achieve this contact interval, the speed of mobile carrier 11 is adjusted accordingly to the stroke of the beam outputs, i.e., their peak to peak amplitude.

The larger the stroke, the faster the speed of mobile carrier 11.

Cessation of resonance is prevented when the tool encounters an immovable object or unyielding material during the forward movement of mobile carrier 11. Specifically, a protective gap is established between the neutral position of the beam outputs and the tool when the tool is unable to advance along the work path responsive to the impulses transferred to it by beams 54, 54'. (This is to be distinguished from the momentary gap described above, which continuously opens and closes during normal operation through yielding material.) In the embodiment disclosed in this specification, the peak sonic force generated by oscillators 56, 56' is substantially greater than the maximum tractive force generated by mobile carrier 11, i.e., the weight of the vehicle and its load. Specifically, the sonic force is sufficiently large relative to the tractive force to enable the sonic force to overcome the tractive force and to drive the entire machine, including material cutting assembly 10 and mobile carrier 11, backwards away from the tool when the tool is unable to advance along the work path. In my application Ser. No. 973,163, the disclosure of which is incorporated herein fully by reference, the protective gap is established in a different manner, namely, by a tool stop which prevents the beam output in its neutral position from contacting the tool when it encounters an immovable object. In either way, by thus establishing a protective gap between the beam output in its neutral position and the tool when it encounters an immovable object, cessation of resonance is prevented. It has been discovered that without such a protective gap, when the tool encounters an immovable object the beam output becomes clamped between the tool and the tool holder, thus terminating resonance and preventing transfer of the oscillator force to the tool. This is a common source of damage to the parts of the tool driving apparatus such as the resonant beam, the oscillator, or portions of the tool carrier. Thus the gap protects the tool driving apparatus from destruction by an immovable object. The term "immovable object" as used in this specification is relative, not absolute; it is an object that hinders the advance of the machine sufficiently that, in the absence of the protective gap, the vehicle would drive the force transmitting member against the tool and would thus prevent the force transmitting member from transmitting the oscillations to the tool, with the result that the apparatus would destroy itself. In the case of a resonant force transmitting member or beam as described herein, when the output of the beams is clamped against the tool, the end of the beam is no longer free and becomes a node. The nodes thus shift and the entire mode of vibration changes, the largest vibrations now occurring at the node supports, which destroys the node supports and/or the oscillator and beams.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the invention can be practiced with other types of force transmitting members, including resonant beams of other configurations, such as the angular configuration shown in my application Ser. No. 973,187, filed Dec. 26, 1978, or non-resonant members. Further, the described support frame could be used with other types of apparatus, such as, for example, an earth or rock ripper.

What is claimed is:

1. A resonant system comprising a beam, means supporting the beam intermediate the ends of the beam, the ends being free to move laterally with arcuate bending of the beam, and oscillator means secured to the beam at one end for inducing resonant vibration of the beam to achieve work output at the other opposite end of the beam, the oscillator means including a housing formed in the beam as an integral part thereof, at least two pairs of equal size axially aligned bearings mounted in the housing, a shaft journaled in the bearings, two outer eccentric weights of equal size mounted on the shaft with the two pairs of bearings positioned between the two outer weights, at least one inner eccentric weight having an aggregate weight equal to the sum of the outer weights mounted on the shaft between two pairs of bearings, the eccentric positions of each said weight being fixed and equal, and means for rotating the shaft and eccentric weight, whereby the eccentric forces exerted on each of the bearings is substantially equal.

2. Apparatus of claim 1 wherein said bearings are frictionless type bearings having an inner race and an outer race, the outer race being fixedly mounted in the housing and the inner race slidably receiving said shaft, and means keying the inner race of the bearings to the shaft for preventing relative rotation between the inner race and the shaft while permitting axial displacement between the inner race and the shaft.

3. The apparatus of claim 1 wherein the housing and beam are formed from a single piece of metal.

4. Apparatus of claim 3 wherein the housing includes a bore extending transverse to the longitudinal axis of the beam, the shaft being journaled in said bore.

5. Apparatus of claim 4 wherein said bore is enlarged at either end and at the middle, the eccentric weight means including three eccentric weights positioned on the shaft respectively in the enlarged portions of the bore.

6. Apparatus of claim 5 further including end plates positioned at either end of the bore to form the enclosed housing for the rotating weights.

* * * * *